(No Model.)
C. H. RICH.
AXLE.
No. 342,136. Patented May 18, 1886.
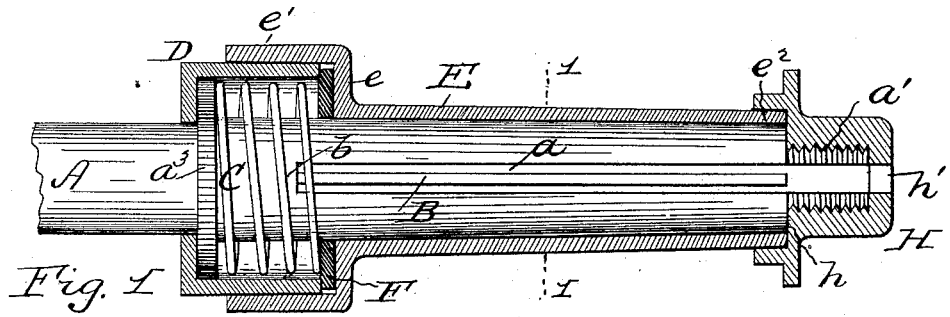
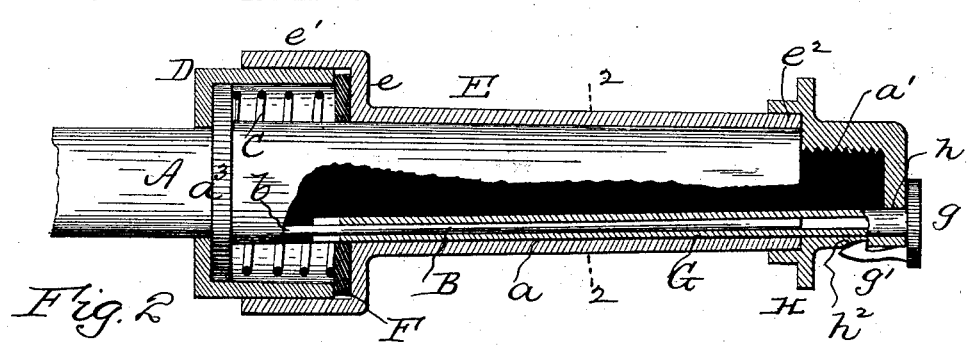
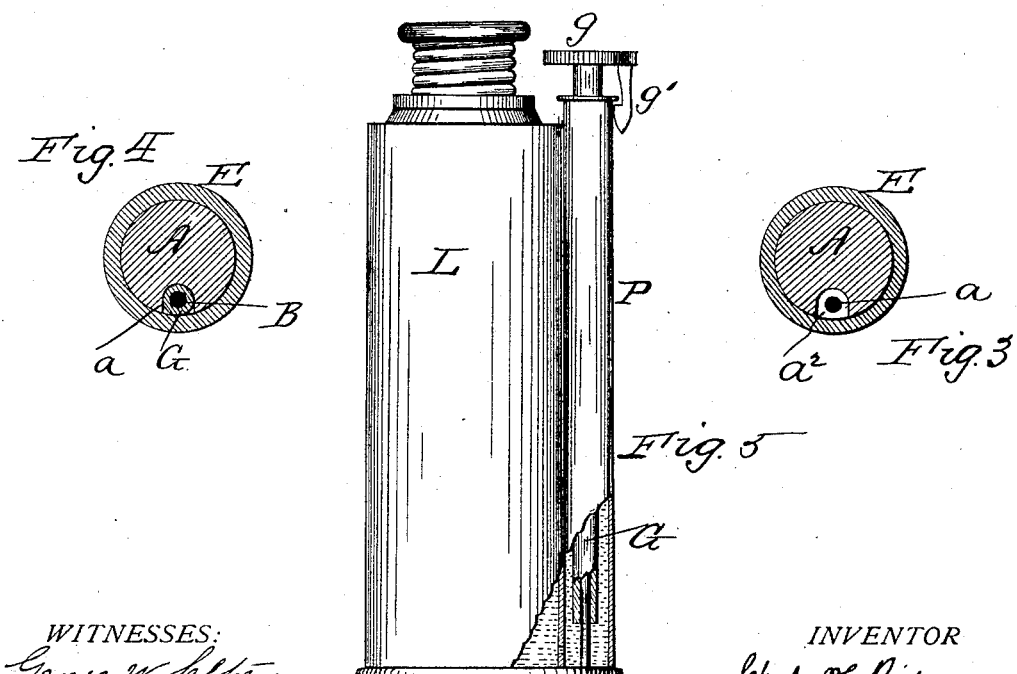
WITNESSES:
George W. Seltzer
H. Conrad Brick
INVENTOR
Charles H. Rich
by Allen H. ——
his ATTORNEY

UNITED STATES PATENT OFFICE.

CHARLES H. RICH, OF CHATHAM RUN, PENNSYLVANIA.

AXLE.

SPECIFICATION forming part of Letters Patent No. 342,136, dated May 18, 1886.

Application filed October 1, 1885. Serial No. 178,686. (No model.)

*To all whom it may concern:*

Be it known that I, CHARLES H. RICH, of Chatham Run, in the county of Clinton and State of Pennsylvania, have invented a new and valuable Improvement in Axles; and I do hereby declare that the following is a full, clear, and exact description of the construction and operation of the same, reference being had to the annexed drawings, making a part of this specification, and to the letters and figures of reference marked thereon.

Figure 1 is a longitudinal section, partly in elevation, of hub-sleeve, axle, and axle-nut, showing my improvement, excepting the oiling-cylinder or tube, the latter being removed to show the rod in the groove in the axle. Fig. 2 is a like view showing oiling-tube in position within the axle-groove. Fig. 3 is a cross-section on line 1 1, Fig. 1. Fig. 4 is a like view on line 2 2, Fig. 2; and Fig. 5 is an elevation, partly in section, of an oil-can specially adapted for use in connection with my improvements.

My invention has relation to oiling carriage-axles; and it consists in the construction of the axle, axle-nut, and hub-sleeve to adapt them to receive an oiling tube or cylinder which is locked or secured to said parts to effect an economical lubrication of the axle and its bearings.

My invention accordingly consists of the combination, construction, and arrangement of parts as hereinafter more particularly described and claimed.

In the drawings, A represents a carriage-axle, in one side of which is formed a slot, $a$, which arises from near the back part of the axle and extends out to the end of the screw or threaded part or end $a'$ of said axle, as shown more plainly in Fig. 1. Within slot $a$ is placed a rod, B, firmly secured at $b$ to the axle, and is so arranged in the slot as to leave a clear or annular space all around the same (see Fig. 3) throughout length of the slot, or of such length as desired.

Surrounding the rear portion of the axle, and abutting at one end against the axle-collar $a^3$, is a spiral spring, C, around which is a sheath, D, loosely secured back of collar $a^3$ to the axle; or said sheath may be firmly attached to the axle, if desired.

E represents the hub-sleeve, having shoulder $e$ and enlarged rear end, $e'$, to fit over sleeve D, and between it and said shoulder is inserted a rubber or flexible washer, F, to make a sealed or tight joint between said sleeve and sheath. The front end of spring C bears against said washer and acts to keep the forward end, $e$, of sleeve E in close contact with the inner side, $h$, of the nut H on the threaded end $a'$ of the axle A, to make a tight joint at said end. Said nut H is provided with an end opening, $h$, which is designed to register with the axle-slot, $a$, when said nut is screwed up.

Such described construction affords an axle having a hub-sleeve with tight or sealed end joints and a longitudinal slot communicating with and opening in the axle-nut, through which oil is adapted to be inserted into the axle-slot $a$ for lubricating the axle.

To provide for placing the oil in the axle-slot $a$, I prefer to use an oiling tube or cylinder, G, having a head, $g$, and spring-catch $g'$. This is first filled with oil by simply inserting it into an oil-can, L, or, preferably, into a subdivision, P, of an oil-can, as shown in Fig. 5. Said tube, when filled, is passed through the nut opening $h$ and inserted into axle-slot $a$. As soon as the end of rod B enters said tube G its contained grease or oil is pushed or squeezed out of the tube G into slot $a$, from whence it finds its way to the axle. The oil or grease in said slot is prevented from leaking therefrom by reason of the sealed or tight joints between the sheath D and sleeve E and between the latter and nut H. To lock the oiling-tube G in slot $a$ a recess, $h$, is formed in one side of nut with the shoulder of which engages the spring-catch $g'$ on the head $g$ of tube G, as plainly shown in Fig. 2.

I do not limit myself to any configuration of axle-slot $a$ in cross-section, nor to its location, nor to the form of the oiling-tube, as it is obvious that various constructions of said parts may be used without departing from the spirit of my invention. Again, while I have shown my improvements especially applicable for carriage-axles, yet I do not wish to be understood as confining myself thereto, as they may be employed in connection with other vehicle-axles.

What I claim is—

1. The axle A, having longitudinal slot $a$, in which lies a rod, B, in combination with a hub-sleeve, E, having tight end joints, and nut H, having opening $h$, substantially as shown and described.

2. The axle A, having slot $a$ and rod B, the spring C, washer F, sheath D, sleeve E, and nut H, having opening $h$ registering with slot $a$, substantially as shown and described.

3. The combination of axle, it having slot $a$ and rod B, nut H, having opening $h$, oiling-tube G, and devices for locking the tube G in the axle-slot, substantially as shown and described.

In testimony that I claim the above I have hereunto subscribed my name in the presence of two witnesses.

CHARLES H. RICH.

Witnesses:
JAMES P. PETIT,
GEORGE W. SELTZER.